United States Patent [19]

Gorman

[11] Patent Number: 4,673,926
[45] Date of Patent: Jun. 16, 1987

[54] LIQUID CONTAINMENT AND LEAK DETECTION SYSTEM

[76] Inventor: Walter T. Gorman, 115-14 Beach Channel Dr., Rockaway, N.Y. 11694

[21] Appl. No.: 701,281

[22] Filed: Feb. 12, 1985

[51] Int. Cl.⁴ .................. G08B 21/00; G01M 3/04
[52] U.S. Cl. .................................. 340/605; 73/40.5 R
[58] Field of Search .............. 340/605; 73/40.5 R; 116/DIG. 7

[56] References Cited

U.S. PATENT DOCUMENTS

| | | | |
|---|---|---|---|
| 3,564,526 | 2/1971 | Butts | 340/605 X |
| 3,874,222 | 4/1975 | Ladd et al. | 340/605 X |
| 4,288,654 | 9/1981 | Blom et al. | 340/605 X |
| 4,332,170 | 6/1982 | Belval et al. | 340/605 X |
| 4,568,925 | 2/1986 | Butts | 340/605 |

FOREIGN PATENT DOCUMENTS 155886  8/1979  Japan ........................ 73/40.5 R Primary Examiner—James L. Rowland
Assistant Examiner—Brian R. Tumm
Attorney, Agent, or Firm—Wenderoth, Lind and Ponack

[57] ABSTRACT

A liquid pipeline leak detector and containment system comprising an enclosure for a pipeline having a leak detector at the base thereof, said enclosure comprising a transparent or translucent sheet of plastic impermeable to said liquid, e.g. hydrocarbons. Any liquid leakage is contained by the enclosure and the accumulated liquid at the bottom of the enclosure facilitates activation of the detector.

13 Claims, 3 Drawing Figures

LIQUID CONTAINMENT AND LEAK DETECTION SYSTEM

BACKGROUND AND PRIOR ART

The present invention relates to an improved system for detecting leaks in pipelines carrying liquid hydrocarbons or the like, or any other liquid which should be contained and detected, which system also provides containment for pipeline leaks.

In Butts, U.S. Pat. No. 3,564,526, there is disclosed a device for detecting leaks in pipelines which comprises two conductors wrapped around each other, with a layer of butyl rubber for preventing electrical contact between said conductors. When the pipeline, which contains hydrocarbon, leaks, the butyl rubber preventing the conductors from contacting each other is degraded, whereby the conductors then contact each other and activate an alarm.

The major deficiencies of this system include the fact that it takes a rather substantial leak to accumulate sufficient hydrocaron to degrade the butyl rubber or other similar material, particularly when the hydrocarbon leaks into the ground. Such leakage also results in environmental contamination.

OBJECTIVES AND BRIEF SUMMARY

Accordingly, it is an objective of the present invention to provide a system which contains the leaked hydrocarbon or other detectable liquid, to accumulate a sufficient volume for effective detection in a device such as that of Butts or any degradable tube and, moreover, which prevents environmental contamination caused by such leakage.

These and other objectives are realized by the present invention wherein there is provided a specially designed enclosure around the pipeline and leak detector. The enclosure is made of a plastic sheet which is impermeable to liquid, e.g. hydrocarbon. Thus, the liquid from a leak readily accumulates in sufficient volume to degrade the butyl rubber or similar material and thereby activate the detector. The plastic sheet is transparent or translucent thereby allowing visual inspection during hydrostatic testing of the piping.

DETAILED DESCRIPTION

In the practice of this invention, it is apparent that the leak detector can be of any type which requires the substantial presence of a liquid such as a hydrocarbon, e.g., gasoline, for activation.

The leak detector must be provided with a sensor cable which is just below the pipeline and the pipeline-sensor assembly must be wrapped with a plastic sheet so as to permit an accumulation of liquid sufficient to activate the detector.

The enclosure may be sealed in proximity to the top of the pipe by any means such as heat sealing, clips or a tongue and groove construction, e.g. zip-lock type.

It is desirable that the enclosure be able to withstand a pressure of at least 1 p.s.i. to ensure integrity in the event of a substantial leak.

The pipe can be made of steel, plastic or any other suitable material. In this regard, the use of the enclosure over steel piping will avoid the need for costly cathodic protection which is normally employed to retard corrosiion.

The jacket is transparent or translucent to facilitate the location of the leak in the pipeline.

Among suitalble materials for the liquid, e.g. hydrocarbon resistant enclosure, there may be mentioned neoprene, Hypalon ®, and Hytrel ® both available from DuPont Corp., Wilmington, Del. Nitrile rubber is also suitable for use in the present invention.

It is preferred to employ a cable guide along the inner bottom surface of the enclosure, when the leak detector includes a sensor or detector cable of the type disclosed by Butts. Such cable guide may comprise loops disposed along the bottom inside surface of the enclosure.

The invention will now be described with reference to the figures.

Figure 1:
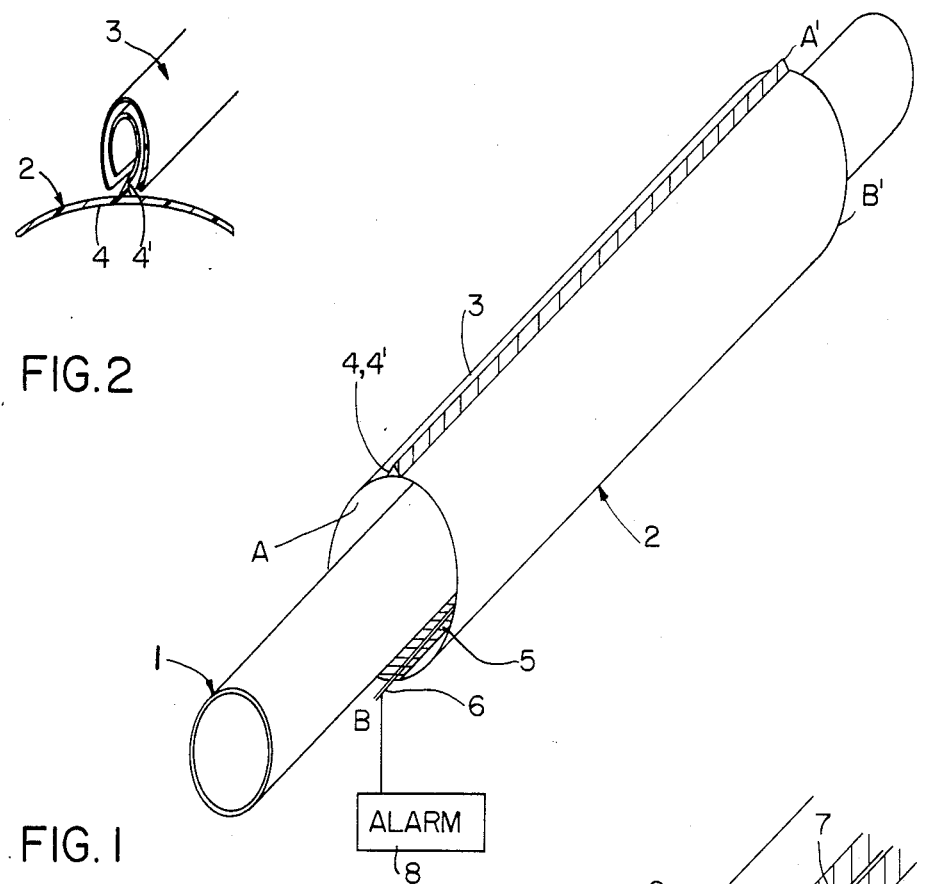
FIG. 1 is a perspective view of an embodiment of the pipeline-leak detection system of the present invention.

In FIG. 1, 1 represents a pipeline, enclosd in a cylindrical sheet formed of Hytrel ® plastic with the edges 4,4' of said sheet having snap-on clip 3 thereover to ensure a tight seal, 5 represents a detector cable guide, 6 represents a detector cable and 8 represents an alarm responsive to leaks detectedby said detector cable.

Figure 2:
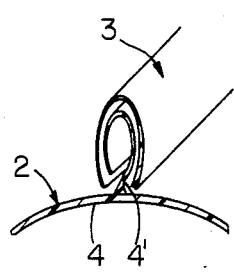
FIG. 2 is an enlarged perspective view along line A—A' of the present invention.

FIG. 2 depicts the manner in which the clip 3 is applied to the edges 4,4'.

Figure 3:
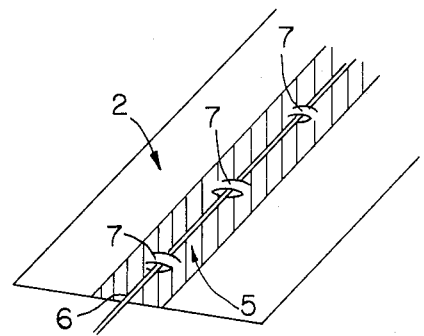
FIG. 3 is an enlarged perspective view along line B—B' of the present invention.

FIG. 3 depicts cable guide 5 adhered to the inside bottom surface of the enclosure 2. The cable guide is comprised of a strip of plastic having a series of parallel slits therein. The detector cable 6 is led through a loop 7 formed by parallel slits over the bottom inside surface to the next parallel slits.

Cable 6 is of the type disclosed and depicted by the above discussed Butts patent, the disclosure of which is incorporated by reference herein. While the details of the cable are not depicted herein, it comprises an inner conductor (wire) coated with butyl rubber and an outer conductor (wire) spirally wrapped around the butyl rubber coating.

The accumulated hydrocarbon from a leak readily collects in the area of the cable guide, degrading the butyl rubber and causing the wires to contact each other whereby an alarm is. activated.

Numerous other modifications within the scope and spirit of the present invention will be apparent to those skilled in the art.

I claim:

1. A leak containment and visual detection system for a pipe carrying a liquid which comprises:
   a. a length of pipe,
   b. a leak detector responsive to said liquid, and
   c. a transparent or translucent plastic sheet impermeable to said liquid, wrappable about said pipe,
   said detector being disposed below said pipe, said plastic sheet forming an enclosure about said detector and pipe, and
   said detector being in proximity to the bottom of said enclosure,
   whereby any liquid leaking from said pipe is collected at the bottom of said enclosure and is placed in intimate contact with said detector to facilitate a response by said detector to said liquid while providing containment for said liquid, and said liquid collected by said enclosure being visually detectabel through said enclosure.

2. The system according to claim 1 wherein said leak detector comprises an alarm and a sensor cable responsive to the presence of liquids, said sensor cable including two conductors and a liquid degradable electrically insulating material interposed therebetween, said alarm being activated when said conductors contact each other, said contact being prevented by said liquid degradable electrically insulating material interposed between said conductors;

whereby an accumulation of said liquid at the bottom of said enclosure degrades said electrically isulating material to activate said alarm.

3. The system acording to claim 2 wherein the edges of said sheets are joined to form said enclosure in proximity to the top of said pipe.

4. The system according to claim 3 wherein said edges are joined by heat sealing.

5. The system according to claim 3 wherein said edges are joined by a clip.

6. The system according to calim 2 wherein said sensor cable is disposed in proximity to the botom of said enclosure.

7. The system according to claim 6 wherein said cable is held in place in proximity to the bottom of said enclosure by a cable guide disposed along the bottom inside surface of said enclosure.

8. The system according to claim 7 wherein said cable guide comprises loops integral with the bottom inside surface of said enclosure.

9. The system according to claim 1 wherein said enclosure is capable of withstanding a pressure of at least 1 p.s.i.

10. A process for containing and visually detecting leaks in a pipe carrying liquid, having just below the botom thereof, a leak detector which process comprises:

forming an enclosure about said pipe and said detector with a transparent or translucent sheet of liquid impermeable plastic wrappable about said pipe and said detector, whereby any liquid leaking from said pipe activates said detector while said liquid is contained by said enclosure and is visually detectable through said enclosure.

11. The process according to claim 10 wherein said detector comprises an alarm system including two conductors, which alarm system is activated when said two conductors contact each other, said contact being prevented only by a liquid degradable, electrically insulating material interposed between said conductors, whereby any liquid leaking from said pipe is urged into contact with said liquid degradable material whereby said alarm is activated.

12. The process according to claim 11 wherein said liquid is a hydrocarbon.

13. The process according to claim 12 wherein said hydrocarbon is gasoline.

* * * * *